(12) United States Patent
Alay et al.

(10) Patent No.: US 11,982,020 B2
(45) Date of Patent: May 14, 2024

(54) METHOD FOR PRODUCTION OF POLY-VINYL ALCOHOL-FILAMENT FIBRE OF HIGH STRENGTH AND ELASTICITY

(71) Applicant: Veritas Tekstil Konfeksiyon Pazarlama Sanayi Ve Ticaret Anonim Sirketi, Denizli (TR)

(72) Inventors: Mehmet Kivanç Alay, Denizli (TR); Mustafa Soylu, Denizli (TR)

( * ) Notice: Subject to any disclaimer, the term of this patent is extended or adjusted under 35 U.S.C. 154(b) by 203 days.

(21) Appl. No.: 17/424,114

(22) PCT Filed: Jul. 1, 2020

(86) PCT No.: PCT/TR2020/050565
§ 371 (c)(1),
(2) Date: Jul. 19, 2021

(87) PCT Pub. No.: WO2021/002820
PCT Pub. Date: Jan. 7, 2021

(65) Prior Publication Data
US 2022/0064822 A1 Mar. 3, 2022

(30) Foreign Application Priority Data

Jul. 1, 2019 (TR) .................................. 2019/09816

(51) Int. Cl.
*D01F 6/14* (2006.01)
*D01D 5/06* (2006.01)
*D01F 13/04* (2006.01)

(52) U.S. Cl.
CPC ............... *D01F 6/14* (2013.01); *D01D 5/06* (2013.01); *D01F 13/04* (2013.01)

(58) Field of Classification Search
CPC ............ D01F 6/14; D01F 13/04; D01D 5/06
See application file for complete search history.

(56) References Cited

U.S. PATENT DOCUMENTS

| 3,102,775 A | 9/1963 | Seeger |
| 5,229,057 A | 7/1993 | Ohmory et al. |
| | (Continued) | |

FOREIGN PATENT DOCUMENTS

| CN | 108975457 A | 12/2018 |
| CN | 109912834 A | 6/2019 |
| | (Continued) | |

OTHER PUBLICATIONS

International Search Report and Written Opinion of the International Searching Authorityfor corresponding PCT/TR2020/050565, dated Oct. 13, 2020.

*Primary Examiner* — Timothy Kennedy
*Assistant Examiner* — John Robitaille
(74) *Attorney, Agent, or Firm* — Egbert, McDaniel & Swartz, PLLC

(57) ABSTRACT

A filament fibre production method having process steps of: filtration of and/or applying an evaporation process to wastewater containing a polyvinyl alcohol polymer from a sizing process and/or a painting process in a manner to contain polyvinyl alcohol polymer at rate of 20-30% by mass, adding carbonyl di-imidazole and ethylenediamine or 3-chloro-propionyl chloride and ethylendiamine into wastewater comprising polyvinyl alcohol polymer in 20-30% rate as a result of filtration and/or evaporation process and obtaining PVA-ethylendiamine hydrogel solvent, adding dimethyl sulfoxide, boric acid, acetic acid and a surface active agent into a solvent bath containing PVA-ethylendiamine hydrogel solvent at 20-30% rate, applying coagulation process to obtained PVA-ethylendiamine hydrogel solvent with acetone of critic fluid phase, stretching polyvinyl alcohol polymer passing through coagulation bath at 200 C.°-250 C.° temperature range when wet, and subjecting to fixing process.

11 Claims, 1 Drawing Sheet

(56) References Cited

U.S. PATENT DOCUMENTS

| | | | |
|---|---|---|---|
| 5,455,114 A | 10/1995 | Ohmory et al. | |
| 6,743,859 B2 | 6/2004 | Kowaka et al. | |

FOREIGN PATENT DOCUMENTS

| | | | |
|---|---|---|---|
| EP | 0239044 A2 | 9/1987 | |
| JP | S6477615 A | 3/1989 | |
| JP | H07278950 A | 10/1995 | |

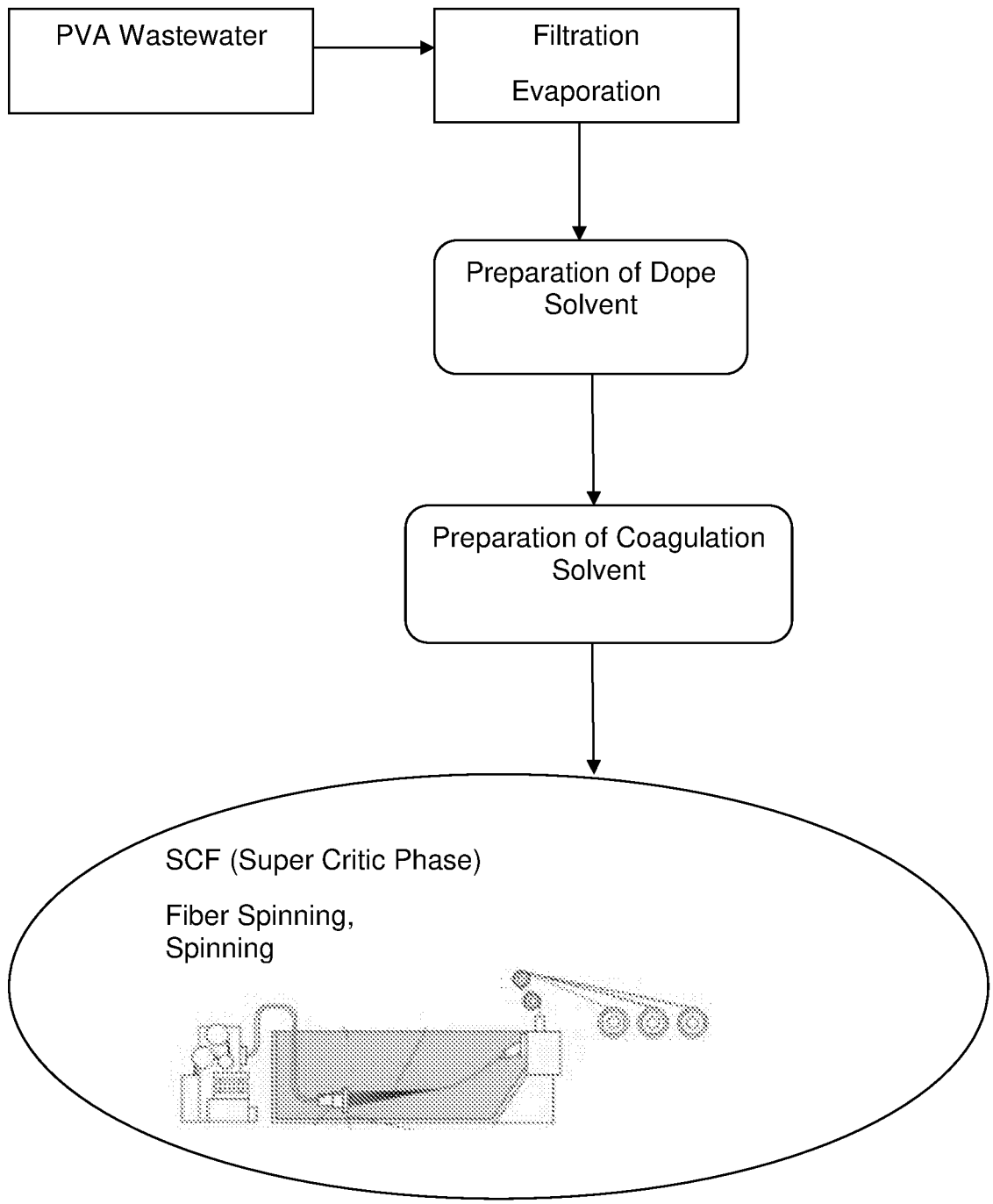

METHOD FOR PRODUCTION OF POLY-VINYL ALCOHOL-FILAMENT FIBRE OF HIGH STRENGTH AND ELASTICITY

THE RELATED ART

Invention relates to wet drafting method of super critic fluidity phase to obtain polyvinyl alcohol filament fibre of high strength and elasticity from polyvinyl polymer gained from wastewater recycling for use in textile sector.

The invention particularly relates to filament fibre obtaining by use of preparing dope solvent, coagulation bath and super fluid phase drafting process by means of enhancing concentration of polyvinyl alcohol (PVA) polymer in wastewater arising from sizing process or painting process.

BACKGROUND OF THE RELATED ART

Polyvinyl alcohol (PVA) is polymer dissoluble in water, non-toxic and commonly used in various industrial fields. Polyvinyl Alcohol (PVA) polymer being studied in various studies since 1960s because of its non-toxic structure has a production capacity over 1 million tons a year and 1 billion euro market size a year. In this context, developments to be achieved in production of Polyvinyl Alcohol (PVA) polymer are highly important. One of essential area of use of Polyvinyl alcohol (PVA) polymer is textile. Several companies such as Kuraray, Du Pont, Wanwei Group, Sinopec Sichuan Vinylon Works, Xiangwei, Mini Fiber, Unitika, Fuwei, NITIVY, Nycon Corporation, Sinopec-SV worldwide use Polyvinyl alcohol (PVA) polymer to produce yarn. Polyvinyl alcohol (PVA) polymers has an essential advantage in various fields such as composite applications concrete and external reinforcing because of their high strength. Polymer chain structure of said Polyvinyl alcohol (PVA) polymer is given below.

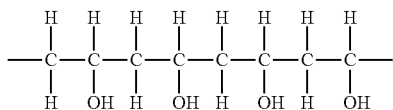

In the said related art, Polyvinyl alcohol (PVA) polymer is used as sizing agent to increase strength of cotton yarns during weaving process. When polyvinyl alcohol (PVA) dissoluble easily in water is removed from centre yarn, it reaches hollow yarn structure and wastewater comprising Polyvinyl alcohol (PVA) is released. On the other hand, yarn is made by means of twisting opposing regular twist of cotton when made with Polyvinyl alcohol (PVA). Thus, cotton yarn untwisted by help of PVA can be woven without breaking (can be done up to zero twisting) and final fabric can be manufactured by removal of PVA from woven fabrics during painting phase. Said obtained final fabric is considerably softer in comparison to its similar fabrics, has high water absorbing and feature of releasing water in period shorter in comparison to similar ones. Wastewater releasing during it comprises Polyvinyl alcohol (PVA). It is highly essential for sector to increase concentration of Polyvinyl Alcohol (PVA)polymer in wastewater containing polyvinyl alcohol polymer releasing in said sizing operation and painting process, and to regain said polymer. However, although filtration systems used for wastewater today are adequate to concentrate Polyvinyl alcohol (PVA) polymer, recycling process capable to gain Polyvinyl alcohol (PVA) polymer based filament fibre is not available. Another technical problem experienced in the related art is the failure to provide viscosity value of Polyvinyl alcohol (PVA) polymer concentrated from wastewater appropriate for wet drafting process. If it is not achieved to obtain waste Polyvinyl Alcohol (PVA) polymer molecules in desired concentration, breaking is experienced during wet drafting process and breaking strength, elasticity and efficiency of filament to be obtained will be low. Concentration of polyvinyl alcohol (PVA) polymer gained from wastewater in solvent is low and polymer chair size is low. For that reason, efficiency of Polyvinyl Alcohol (PVA) polymer is low during conventional wet fibre spinning process. The related art does not have an application solving said technical problems.

During patent search conducted for the current status of related art, an American patent application numbered U.S. Pat. No. 5,455,114 A is encountered. Said document discloses a method comprising process steps of preparation of dope solvent comprising dimethyl sulfoxide and dry-jet wet spinning bath for production of water soluble high tensile strength PVA filament. In aid method. process of fibre spinning in methanol medium is also applied. However, fibre obtained as a result of said processes is under high rate spinning values. In another patent application numbered U.S. Pat. No. 6,743,859 B2 for polyvinyl alcohol (PVA) polymer based filament production, water, acetone, benzene, toluene, dimethyl formamide, dimethylacedamine and dimethyl sulfoxide are used as solvents and alcohols such as methanol, ethanol are used as coagulants. For said coagulation bath, mixtures of a fixed rates of solvents and coagulants are preferred. However, in case of drying at temperatures under 200° C., molecule chains do not have sufficient motion for higher spinning rates and crystallinity and mechanical strength decrease. Patent application numbered U.S. Pat. No. 5,229,057 aims to produce a high mechanical strength fibre by use of a coagulating bath at and under 20° C. Poly vinyl alcohol (PVA) polymers having polymerization rate above 1500 enable achievement of high strength fibres because of having less molecule end sections causing micro structural faults.

In conclusion, several problems and negativities as described above are experienced in the related art and present systems are insufficient for settlement of the problems and negativities. This case makes it necessary to make a development and novelty in the related art.

BRIEF DESCRIPTION OF THE INVENTION

The present invention relates to a filament fibre production method meeting the needs mentioned above, eliminating all disadvantages and providing some additional advantages.

Primary purpose of the invention is to obtain polyvinyl alcohol filament fibre having high strength and elasticity.

Another purpose of the invention is to produce filament fibre by use of wet or dry spinning method comprising concentrating Polyvinyl alcohol (PVA) polymer in dissolved form in wastewater during sizing and painting processes. The method of the invention provides achievement of a high efficient and sustainable recycling process and a convenient process in economic terms.

In order to achieve said purposes, the invention is a method for filament fibre production comprising process steps of;

A filament fibre production method comprising process steps of:

Filtration of and/or applying evaporation process to wastewater containing Polyvinyl alcohol polymer from sizing process and/or painting process in a manner to contain Polyvinyl alcohol polymer at rate of 20-30% by mass, into wastewater comprising Polyvinyl alcohol polymer in 20-30% rate as a result of filtration and/or evaporation process, adding Carbonyl di-imidazole and Ethylenediamine or 3-chloro-Propionyl chloride and Ethylendiamine and obtaining PVA-Ethylendiamine hydrogel solvent, Adding dimethyl sulfoxide, Boric Acid, Acetic Acid and surface active agent into solvent bath containing PVA-Ethylenediamine hydrogel solvent at 20-20% rate, Applying coagulation process to obtained PVA-Ethylendiamine hydrogel solvent with acetone of critic fluid phase, Stretching Polyvinyl alcohol polymer passing through coagulation bath at 200 C.°-250 C.° temperature range when wet, and subjecting to fixing process.

The structural and characteristics features and all advantages of the invention will be understood better with detailed descriptions given below. Therefore, the assessment should be made taking into account the detailed description.

FIGURES FOR BETTER UNDERSTANDING OF INVENTION

FIG. 1 shows schematic view of filament fibre production method of the invention.

DETAILED DESCRIPTION OF THE INVENTION

In this detailed description, the preferred embodiments of the invention have been described in a manner not forming any restrictive effect and only for purpose of better understanding of the matter.

The invention relates to a method for filament fibre production for use in textile sector. In the method of the invention, said filament fibre is obtained by means of recycling of wastewater containing polyvinyl alcohol (PVA) polymer. Process steps of the method of invention are shown schematically in FIG. 1. According to the FIGURE, wastewater containing Polyvinyl alcohol (PVA) polymer is obtained from two different sources. One of the is sizing process. Said sizing process is realized by means of providing absorption of agents such as carboxy methyl cellulose, polyvinyl alcohol by yarns to be used in weaving in order to increase resistance of yarn. During that time while said sizing agents (carboxy methyl cellulose, polyvinyl alcohol) are fixed onto yarn surface by physical powers, the section not appliqued is discharged into wastewater. Rate of Polyvinyl alcohol (PVA) in said wastewater is 1-1.5% by mass. Another source of wastewater containing Polyvinyl alcohol (PVA) polymer is obtained from painting process. In normal process, in order to achieve high water absorption and soft touching features, cotton yarn is spun in reverse spinning with polyvinyl alcohol (PVA) polymer and after said spinning, weaving is started and fabric of various constructions are obtained. When the obtained fabrics is treated with acidic water at high or low temperatures during painting process, wastewater containing polyvinyl alcohol (PVA) polymer at 1-1.5% rate by mass is obtained. Rate of Polyvinyl alcohol (PVA) polymer rate in the wastewater obtained in said processes by mass is brought to 20-30% range by mass in filtration and/or evaporation process steps and thus regained concentrate Polyvinyl Alcohol (PVA) polymer is obtained. Polymerization date of said obtained polymer is in the range of 500-3500. In the method of the invention, chemical reactions are performed to prepare dope solvent in the first process step. There are two alternative reactions for preparation of said dope solvent. In the first alternative reaction is initiated by adding Carbonyldiimidazole (CDI) and Ethylendiamine in rate of 10-20% rate by mass into medium having Polyvinyl alcohol (PVA) polymer. Said reaction is shown in FIGURE below.

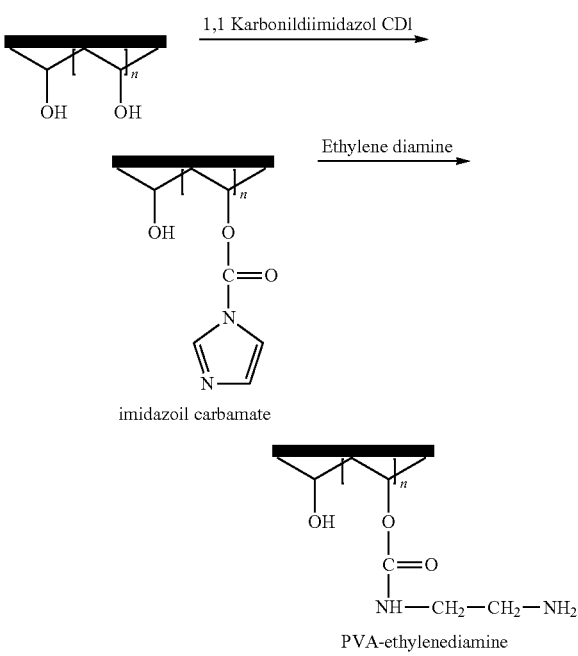

In other alternative, reaction is executed by adding 3-Chloro Propionyl chloride and Ethylenediamine in range of 10-20% onto Polyvinyl alcohol(PVA) polymer. Said reaction is shown in FIGURE below.

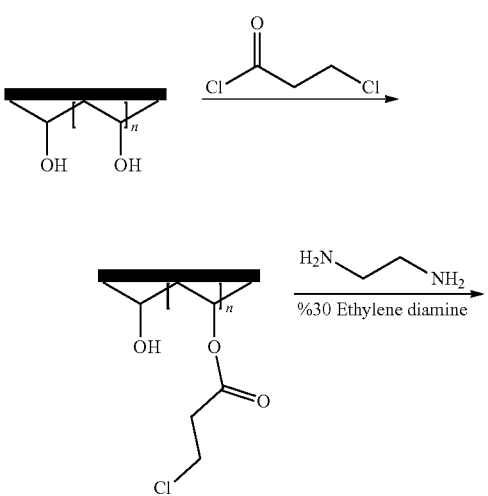

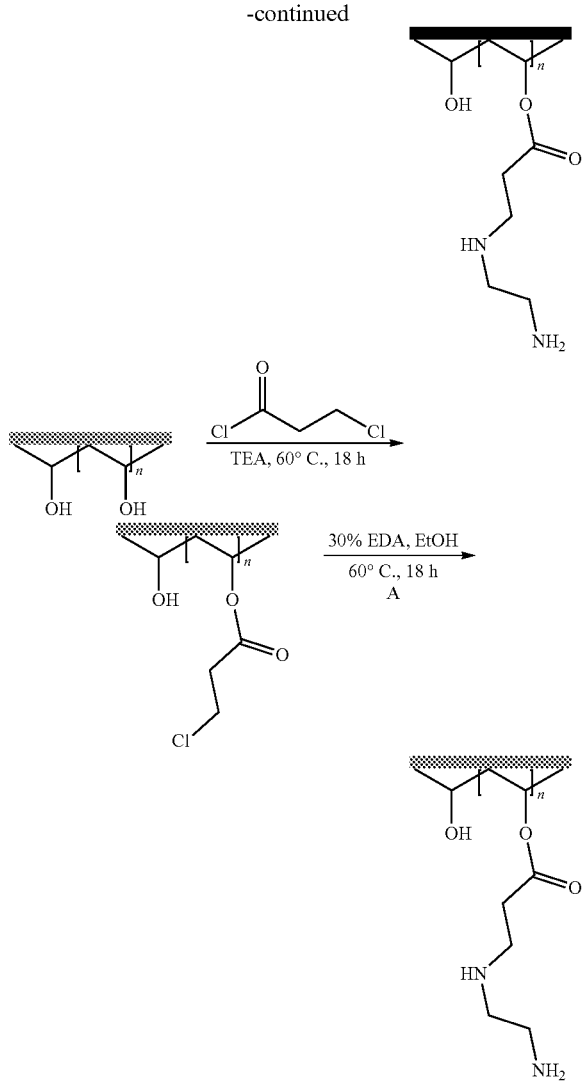

Thus PVA-Ethylenediamine hydrogel solvent is prepared by use of either of said two alternatives. This provides increase in disassociation arising as a result of getting closure between PVA polymers, cross bonding between non-concentrated PVA molecules. Thus, formation of aggregation increases, physical structure of colloidal suspension in homogeneity form occurs. The obtained hydrogel structure is shown below.

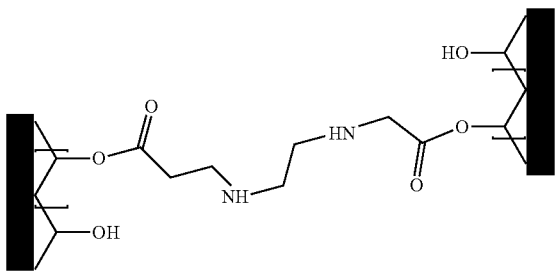

Hydrogel structure
PVA/Ethylenediamine
complex structure

Colloidal suspension physical structure in homogenous form obtained in this stage is formed to increase polymerization rate, strength, elasticity and efficiency of Polyvinyl alcohol (PVA) in wastewater. In the second process step, dimethyl Sulfoxide in rate of 30-40% by mass, Boric Acid in rate of 0.1-1.0% by mass, Acetic Acid with pH value in range of 4 to 5 are added to waste water mixture containing Polyvinyl Alcohol (PVA) Ethylendiamine hydrogel solvent in rate of 20-30% by mass. In addition to said added chemicals, surface active agent is also added in this stage. As surface active agent, Polyethylene Glycol in rate of 1/20% by mass or non-ionic Polyhydric alcohol in rate of 1-20% by mass can be used. However, coagulation process is needed to improve strength, elasticity features of Polyvinyl alcohol (PVA) polymer based filament aimed to be obtained and to provide surface homogeneity. Said coagulation process provides convey of acetone is diffused form between Polyvinyl alcohol (PVA) polymer and thus penetration of acetone into Polyvinyl alcohol (PVA) polymer is provided in critic phase. In said Coagulation Bath, nozzle diameter may vary from 0.11 mm to 0.08 mm and 10-100 g/lt NaOH, 100-300 g/lt Sodium Sulphate, acetone in rate of 2-20% by mass, 2-propanol in rate of 2-20% by mass are used. In the last process step, during super critic phase spinning process is applied. Transition of acetone into critical fluid phase is executed preferably at 235° C. temperature and pressure of 46.9 bars. Density rate of acetone under such circumstances varies from 0.2 g/cm$^3$-0.9 g/cm$^3$, viscosity 0.2-1.0 poise, and diffusion rate 0.1-3.3 cm$^2$/sec. Polyvinyl alcohol (PVA) polymer solvent from nozzles gets solidified in coagulation bath and transformed into filament fibre structure. Polyvinyl alcohol (PVA) polymer from coagulation bath is wound onto roller in fibre form by pressure from nozzles. At this stage it is shrunk at saturated evaporation medium at temperature range of 200° C.-250° C. and fixing between winding rollers is made. Said fixing process fixes spinning forces between Polyvinyl alcohol (PVA) polymer. For that purpose, wet spinning or wet jet dry spinning can be applied. In wet jet dry spinning process, differently from wet spinning, after coagulation bath, shrinking between winding rollers in saturated evaporation medium at temperature range of 200° C.-250° C. is performed and then fixing process is performed.

The invention claimed is:

1. A method of fiber production comprising:
   filtering or evaporating wastewater from a sizings or painting process such that the filtered or evaporated wastewater contains a polyvinyl alcohol polymer in which the polyvinyl alcohol polymer is 20% to 30% by mass of the wastewater;
   adding one of either carbonyl di-imidazole and ethylenediamine or 3-chloro-propionyl chloride and ethylenediamine to the filtered or evaporated wastewater so as to obtain a PVA-ethylenediamine hydrogel solvent;
   adding dimethyl sulfoxide, boric acid, acetic acid and a surface active agent into the solvent both containing the PVA-ethylenediamine hydrogel solvent such that the dimethyl sulfoxide, boric acid, acetic acid and surface active agent are 20% to 30% by mass in the PVA-ethylenediamine;
   coagulating the solvent bath with an acetone of a critical fluid phase;
   stretching a polyvinyl alcohol polymer through the coagulated solvent bath at a temperature of 200° C. to 250° C. when the stretched polyvinyl alcohol polymer is wet; and
   fixing the stretched polyvinyl alcohol polymer.

2. The method of claim 1, wherein the dimethyl sulfoxide is added to 30% to 70% by mass of the solvent bath, the boric acid is added at 0.1% to 1% by mass of the solvent bath, the acetic acid having a pH of between 4 and 5, the surface active agent is added at 1% to 20% by mass.

3. The method of claim 1, wherein the surface active agent is a non-ionic polyethylene glycol.

4. The method of claim 1, wherein the surface active agent is non-ionic polyhydric alcohol.

5. The method of claim 3, wherein the non-ionic polyethylene is 1% to 20% by mass.

6. The method of claim 4, wherein the non-ionic polyhydric alcohol is 1% to 20% by mass.

7. The method of claim 1, wherein the step of coagulating has acetone of 2% to 20% by mass.

8. The method of claim 7, wherein the step of coagulating further comprises:
   adding 10 to 100 grams per liter of sodium hydroxide to the solvent bath.

9. The method of claim 8, wherein the step of coagulating further comprises:
   adding 100 to 300 grams per liter of sodium sulphate to the solvent bath.

10. The method of claim 9, wherein the step of coagulating further comprises:
    adding 2-propanol at 20% to 20% by mass to the solvent bath.

11. The method of claim 1, further comprising:
    transitioning the acetone into the critical fluid phase at a temperature of 235° C. and a pressure of 46.9 bars.

* * * * *